United States Patent [19]

Cornwall

[11] Patent Number: 5,035,097
[45] Date of Patent: Jul. 30, 1991

[54] COUPLING FOR CONCRETE WALL OR FLOOR MOUNTING

[76] Inventor: Kenneth R. Cornwall, 4963 Springfield Dr., Dunwoody, Ga. 30338

[21] Appl. No.: 88,376

[22] Filed: Aug. 24, 1987

[51] Int. Cl.5 .............................................. E04B 5/48
[52] U.S. Cl. ..................................... 52/220; 285/915
[58] Field of Search ................... 285/915; 52/220, 221

[56] References Cited

U.S. PATENT DOCUMENTS

| | | | |
|---|---|---|---|
| 2,180,960 | 11/1939 | Kennedy | 285/915 |
| 3,730,565 | 5/1973 | Steadler | 285/915 |
| 4,261,598 | 4/1981 | Cornwall | 52/221 |
| 4,313,286 | 2/1982 | Harbeke | 52/220 |
| 4,337,603 | 7/1982 | Davidson | 52/221 |
| 4,406,480 | 9/1983 | Izzi | 285/915 |
| 4,420,176 | 12/1983 | Cornwall | 285/158 |
| 4,433,860 | 2/1984 | Lindquist | 285/915 |
| 4,453,354 | 6/1984 | Harbeke | 52/220 |
| 4,638,829 | 1/1987 | Cornwall | 285/64 |
| 4,730,854 | 3/1988 | Cuschera | 285/915 |

FOREIGN PATENT DOCUMENTS

| | | | |
|---|---|---|---|
| 125522 | 9/1979 | Japan | 285/915 |
| 1514464 | 6/1978 | United Kingdom | 285/915 |

Primary Examiner—Henry E. Raduazo
Attorney, Agent, or Firm—Ian C. McLeod

[57] ABSTRACT

An improved coupling (10) adapted to be pressed into or secured in a hole (101) in a concrete floor or wall (100) is described. The coupling (10) is secured in place by a concrete to plastic adhesive (11) and can serve as part of the piping system of a building.

3 Claims, 2 Drawing Sheets

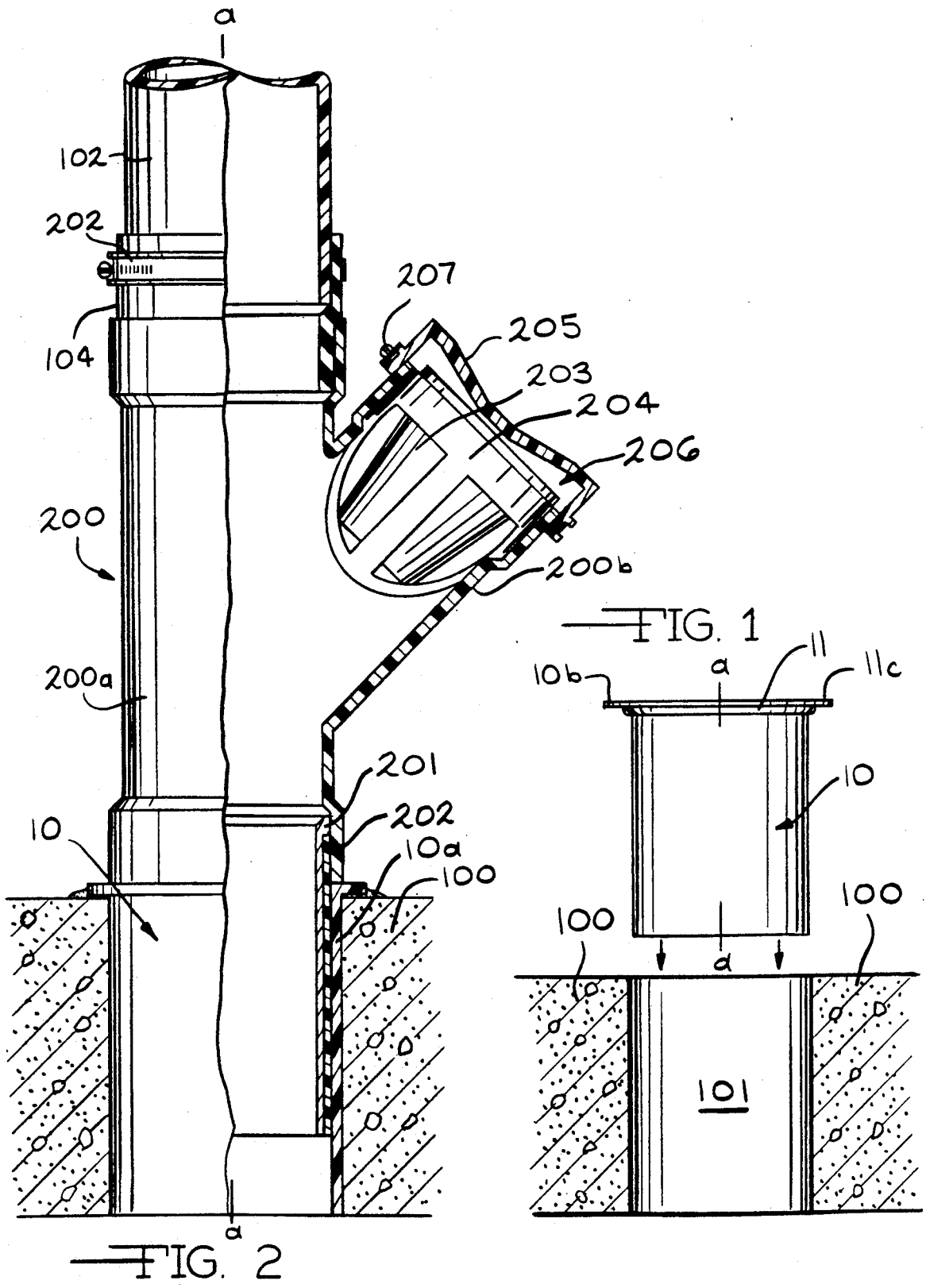

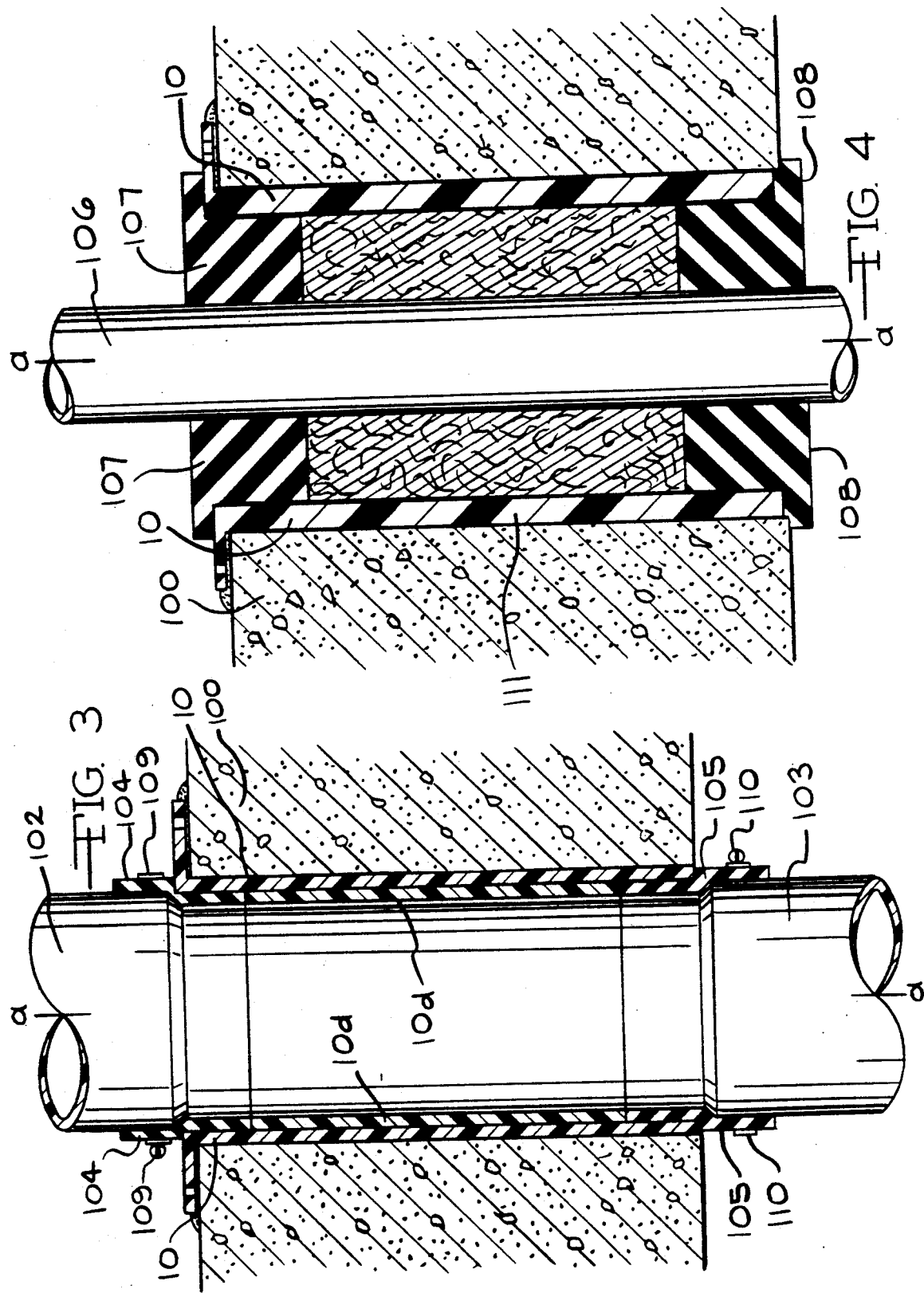

COUPLING FOR CONCRETE WALL OR FLOOR MOUNTING

BACKGROUND OF THE INVENTION (1) Summary of the Invention

The present invention relates to an improved plastic coupling which is secured in place in a cored or drilled hole in a concrete floor or wall. In particular, the present invention relates to an improved coupling which is secured in place in the hole by a plastic to concrete adhesive.

(2) Prior Art

The prior art has described cast-in-place plastic couplings for use in building construction. These are particularly shown in U.S. Pat. Nos. 4,261,598 to Cornwall and 4,453,354 and 4,313,286 to Harbeke. These couplings have projections or ridges on the outside which hold the coupling in place. Fluid concrete is poured around the coupling and then the concrete is allowed to set to form a floor or a wall supporting the coupling. The resulting cast-in-place coupling provides a very good conduit between pipes mounted in the coupling on either side of the floor or wall.

The problem faced by the prior art is that during construction of a building after the wall or floor has been poured and set, a need arises for a coupling mounted through the concrete floor or wall which can function like the cast-in-place coupling. A cast-in-place coupling can be secured in place by providing a large opening in the wall or floor where concrete is then re-poured as a patch around the coupling. The problem is that the coupling and/or patch can work loose. The prior art has not provided an effective means for securing a plastic coupling through a pre-formed floor or wall in a building.

OBJECTS

It is therefore an object of the present invention to provide an improved plastic coupling which can be inserted into a cored or drilled hole in a concrete floor or wall in an interference fit and secured in place using a concrete to plastic adhesive. Further it is an object of the present invention to provide a coupling which provides a leak free seal between the outside of the coupling and a cored or drilled opening in the concrete. Further still, it is an object of the present invention to provide a coupling and method for installing the coupling which is simple and economical to use. Further still, it is an object of the present invention to provide a building construction using the improved coupling. These and other objects will become increasingly apparent by reference to the following description and the drawings.

IN THE DRAWINGS

FIG. 1 shows the improved coupling 10 which is in position for insertion into a cored opening 101 in a concrete floor or wall 100.

FIG. 2 shows a firestop stack fitting 200 mounted in place in the improved coupling 10.

FIG. 3 shows the improved coupling 10 mounted in the cored opening 101 in the floor 100 so as to provide a means for mounting pipes 102 and 103 in position in the coupling 10 by of flexible connectors 104 and 105.

FIG. 4 shows the improved coupling 10 with a pipe 106 supported in place by locating and holding rings 107 and 108.

GENERAL DESCRIPTION

The present invention relates to an integral plastic coupling for plastic pipe and adapted to be mounted in a cored or drilled hole in a concrete floor or wall defined by spaced apart planar surfaces which comprises: a tube with opposed openings having spaced apart inner and outer cylindrical surfaces around a central longitudinal axis of the tube, wherein the inner surface has a first diameter equal to an outside diameter of standard plastic pipe and wherein the outer surface has a second diameter slightly smaller than the cored or drilled hole in the wall or floor so as to have an interference fit in the hole; and a flange around one of the openings in the tube adapted to be secured by a plastic to concrete adhesive to one of the spaced apart planar surfaces of the floor or wall.

Further the present invention relates to a building construction which comprises: an integral plastic coupling for plastic pipe and mounted in a cored or drilled hole in a concrete floor or wall defined by spaced apart planar surfaces which comprises a tube with opposed openings having spaced apart inner and outer cylindrical surfaces around a central longitudinal axis of the tube, wherein the inner surface has a first diameter equal to an outside diameter of standard plastic pipe and wherein the outer surface has a second diameter slightly smaller than a cored or drilled hole in the wall or floor to fit in an interference fit, a flange around one of the openings in the tube adapted to be secured by an adhesive to one of the spaced apart planar surfaces of the floor or wall; plastic pipe mounted in the openings of the coupling and solvent welded to the inner surface of the coupling so as to form a continuous conduit; and a concrete to plastic adhesive securing the coupling in the cored or drilled opening in the concrete floor or wall.

Finally the present invention relates to a method for mounting a coupling in a concrete wall or floor which comprises: providing an integral plastic coupling for plastic pipe and adapted to be mounted in a cored or drilled hole in a concrete floor or wall defined by spaced apart planar surfaces which comprises a tube with opposed openings having spaced apart inner and outer cylindrical surfaces around a central longitudinal axis of the tube, wherein the inner surface has a first diameter equal to outside diameter of standard plastic pipe and wherein the outer surface has a second diameter slightly smaller than a cored or drilled hole in the wall or floor to fit in an interference fit, a flange around one of the openings in the tube adapted to be secured by an adhesive to one of the spaced apart planar surfaces of the floor or wall; drilling or coring the hole in the concrete floor or wall; and press fitting the coupling into the hole in the wall or floor with an adhesive on the flange securing the flange to one floor surface of the wall or floor.

The prior art has developed diamond tipped tools for drilling or coring very precise holes in concrete. The equipment is available from Diamond Products, Inc., Ohio, for instance. The result is a very uniform, cylindrically shaped hole in the floor or wall of a building.

The holes preferably have unitary diameters (1, 2, 3 etc. inches). The coupling is between 0.01 to 0.003 inch undersized.

The prior art has also recently developed adhesives which will permanently bond concrete to plastics used in plastic piping, particularly ABS and PVC. The result is a plastic to concrete bond which results in destruction of the plastic before the bond breaks. These adhesives are flexible, water resistant, smoke resistant and of the mastic adhesive class and are available from 3M in Minneapolis, Minn. This type of adhesive is important to sliding and securing the coupling in place in the hole and is necessary to also provide a permanent seal around the outside of the improved coupling.

The improved coupling has a flange which mates with an upper or lower surface of the floor or wall. The adhesive is provided on an underside of the flange adjacent the tube forming the body of the coupling to provide the bond between the concrete and the improved coupling when it is inserted in the hole. Preferably the flange has openings which are filled with the adhesive when the coupling is inserted into the cored opening. This prevents any rotation of the coupling in the cored opening after the adhesive cures. It primarily makes the joint waterproof and smokeproof.

SPECIFIC DESCRIPTION

FIG. 1 shows a coupling 10 which is about to be pressed into an interference fit in opening 101 in concrete floor or wall 100. A fluid adhesive bead 11 is provided around the coupling 10 which includes the tube 10a forming a body and flange 10b. The tube 10a has an interference fit with opening 101. The flange 10b has openings 10c so that the adhesive 11 extrudes through the openings 10c when the coupling 10 is pressed in place in the opening 101.

FIG. 2 shows a fire stack fitting 200 such as shown in U.S. Pat. No. 4,638,829 by the inventor. The coupling 10 supports a iron sleeve 201 and plastic insert 202 which is solvent welded to the tube 10a. A flexible connector 104 (U.S. Pat. No. 4,420,176), as is known to those skilled in the art, holds a pipe 102 in place in a main conduit 200a and is secured by a clamp 202. The fire stack fitting 200 includes a non-flammable (iron) plug 203 mounted in an extension 200b of the main conduit 200a which is held in place by a harness 204. The extension 200b includes a cover 205 which covers an opening 206 which allows the plug 203 and harness 204 to be positioned in the extension 200b and then closed. A clamp 207 secures the cover 205 in place. The plug 203 is released into the sleeve 201 in the event of a fire below the floor 100 as shown in FIG. 1.

FIG. 3 shows flexible connectors 104 and 105 mounted inside the tube 10a of coupling 10. The connectors 104 and 105 are solvent welded to the inside of the tube 10a of the coupling 10. A plastic insert 10d is solvent welded inside the coupling 10. Connectors 104 and 105 are secured by clamps 109 and 110 to pipes 102 and 103.

FIG. 4 shows the coupling 10 with a pipe 106 along axis a—a and with locating and holding elastic rings 107 and 108 which hold the pipe 106 in place. A fireproof filler 111 is packed between the outside of pipe 106 and rings 107 and 108.

Thus FIGS. 2 to 4 show various uses for the improved coupling. Numerous variations will occur to those skilled in the art. For instance, the pipes 102 and 103 can be secured directly to the coupling 10 by solvent welding in the manner of U.S. Pat. No. 4,261,598 to Cornwall.

It is intended that the foregoing description be only illustrative of the present invention and that the invention be limited only by the hereinafter appended claims.

I claim:

1. A building construction which comprises:
   (a) an integral plastic coupling for plastic pipe and mounted in a cored or drilled hole in a concrete floor or wall defined by spaced apart planar surfaces which comprises a tube with opposed openings having spaced apart inner and outer cylindrical surfaces around a central longitudinal axis of the tube, wherein the inner surface has a first diameter equal to an outside diameter of standard plastic pipe and wherein the outer surface has a second diameter slightly smaller than a cored or drilled hole in the wall or floor to fit in an interference fit, a flange around one of the openings in the tube secured by an adhesive to one of the spaced apart planar surfaces of the floor or wall as a result of being press fitted into the hole with the adhesive as a bead at a junction between the outer cylindrical surface of the tube and the flange; and
   (b) plastic pipe mounted in the openings of the coupling and solvent welded to the inner surface of the coupling so as to form a continuous conduit with the coupling as part of the conduit.

2. The building construction of claim 1 wherein a ring is mounted on the inner surface between the openings inside the tube, the ring having spaced apart parallel sides each of which is perpendicular to the axis of the tube, wherein each of the sides has a height equal to a wall thickness of the plastic pipe mounted in the coupling and an inner portion of the ring between the sides forms part of the conduit.

3. The building construction of claim 1 wherein openings are provided through the flange which are filled with the adhesive so as to aid in holding the flange to the one of the planar surfaces.

* * * * *